United States Patent
Dai et al.

(10) Patent No.: US 8,838,842 B2
(45) Date of Patent: Sep. 16, 2014

(54) METHOD FOR OPTIMIZING CONTROL CIRCUIT FOR FC HDDS IN A SYSTEM AND CONTROL CIRCUIT FOR FC HDDS IN A SYSTEM

(71) Applicant: Jabil Circuit, Inc., St. Petersburg, FL (US)

(72) Inventors: Guang-Cheng Dai, Shanghai (CN); Wei Qin, Shanghai (CN)

(73) Assignee: Jabil Circuit, Inc., St. Petersburg, FL (US)

( * ) Notice: Subject to any disclaimer, the term of this patent is extended or adjusted under 35 U.S.C. 154(b) by 0 days.

(21) Appl. No.: 13/779,882

(22) Filed: Feb. 28, 2013

(65) Prior Publication Data

US 2013/0229726 A1 Sep. 5, 2013

Related U.S. Application Data

(60) Provisional application No. 61/605,791, filed on Mar. 2, 2012.

(51) Int. Cl.
- *G06F 3/00* (2006.01)
- *H04L 12/931* (2013.01)
- *G06F 3/06* (2006.01)
- *G11B 20/10* (2006.01)

(52) U.S. Cl.
CPC .............. *G11B 20/10* (2013.01); *H04L 49/357* (2013.01); *G06F 3/0683* (2013.01)

USPC ................................................. 710/9; 360/49

(58) Field of Classification Search
None
See application file for complete search history.

(56) References Cited

U.S. PATENT DOCUMENTS

| | | | | |
|---|---|---|---|---|
| 6,396,832 | B1 * | 5/2002 | Kranzler | 370/360 |
| 7,110,373 | B2 * | 9/2006 | Lee | 370/328 |
| 7,463,646 | B2 * | 12/2008 | Fike et al. | 370/462 |
| 2006/0206777 | A1 * | 9/2006 | Shen | 714/755 |
| 2008/0112205 | A1 * | 5/2008 | Saado | 365/94 |

* cited by examiner

*Primary Examiner* — Elias Mamo
(74) *Attorney, Agent, or Firm* — McClure, Qualey & Rodack, LLP (57) ABSTRACT

A method for optimizing control circuit for FC HDDs in a system includes determining the number of subsystems supported in a FC loop and the number of HDDs to be supported in each of the subsystems, analyzing binary values of address of all HDDs for each of the subsystems, enumerating logical variations of the address selection signals according to the analyzed binary values to obtain logic combinations for the address selection signals, analyzing logic relations between these logic combinations and a system address signal, selecting logic components required according to the found logic relations, and calculating the total number of required logic components and the number of address selections signals that can share an output pin of each of the required logic components based on properties of output pins of the logic components and maximum input current of the address selection signals.

14 Claims, 4 Drawing Sheets

METHOD FOR OPTIMIZING CONTROL CIRCUIT FOR FC HDDS IN A SYSTEM AND CONTROL CIRCUIT FOR FC HDDS IN A SYSTEM

CROSS-REFERENCE TO RELATED APPLICATIONS

This Application claims priority from U.S. Provisional Patent Application Ser. No. 61/605,791, filed on Mar. 2, 2012, which Application is incorporated by reference herein.

BACKGROUND

1. Technical Field

The invention relates to a method for arbitrated loop physical addressing (ALPA) for different hard disk drives (HDDs) in a Fiber Channel (FC) loop, and more particularly to a method for optimizing control circuit for FC HDDs in a system and control circuit for FC HDDs in a system based on their logic characteristics.

2. Related Art

In a typical example, each FC HDD needs a unique physical address in a FC loop for accessing the HDD correctly. A FC HDD has 7 address selection signals (SEL_ID[6:0]). These signals can make up 128 7-digit binary values (0-127), using 1 to indicate the logic high level and 0 to indicate the logic low level. Then, a HDD encodes the binary values to arbitrated loop physical addresses (ALPAs). According to SFF-8045 specification, the encoded ALPA of 126 (0b1111110) is "0", and it acts as a reserved port. The ALPA of 127 (0b1111111) is a soft address. Therefore, an arbitrated FC loop supports only 126 (0-125) HDDs at the maximum, as is well known in this field.

All of address selection signals of the FC HDDs should be provided by mid-plane. Conventionally, one or more complex programmable logic devices (CPLDs) is used to provide a control signal for each address selection signal, and then the control signal will output the correct logic level (0 or 1) according to the system logic address so as to assign the correct ALPAs to the HDDs.

However, more and more HDDs are in one system to meet the technology development requirements. A system of 8 HDDs requires 56 control signals, a system of 16 HDDs requires 112 control signals, and a system of 48 HDDs requires up to 336 control signals. In this case, the number of CPLD chips or CPLD pins has to be increased to provide sufficient control signals, resulting in the increased cost and more space requirements for CPLDs on the mid-plane. Unfortunately, the available space on the mid-plane for CPLDs decreases when more HDD connectors are mounted and more thermal holes are required. Therefore, it is hard to place a big footprint CPLD or more CPLD chips on the mid-plane according to the conventional design.

SUMMARY

In some embodiments, the disclosure provides a method for optimizing control circuit for FC HDDs in a system and control circuit for FC HDDs in a system that uses a number of logic components to provide address selection signals sufficient for up to 24 or more FC HDDs, which can further decrease the mid-plane cost and space.

In one embodiment, a method for optimizing control circuit for FC HDDs in a system includes determining the number of subsystems supported in a FC loop and the number of HDDs to be supported in each of the subsystems, analyzing binary values of address of all HDDs for each of the subsystems, enumerating logical variations of the address selection signals according to the analyzed binary values to obtain logic combinations for the address selection signals, analyzing logic relations between these logic combinations and a system address signal, selecting logic components required according to the found logic relations, and calculating the total number of required logic components and the number of address selections signals that can share an output pin of each of the required logic components based on properties of output pins of the logic components and maximum input current of the address selection signals.

In one embodiment, a computer program product, capable of implementing the method for optimizing control circuit for FC HDDs in a system according to claim 1 after a computer loads with and executes the program.

In one embodiment, a control circuit for FC HDDs in a system includes a first logic component and a plurality of second logic components. The first logic component receives a system address signal and outputs an intermediate address signal. Each of the second logic components receives the intermediate address signal and outputs multiple sets of a plurality of address selection signals.

In the application of the method for optimizing control circuit for FC HDDs in a system according to the present invention, the logic level of the address selection signals of the FC HDDs varies with the number of subsystems included in a FC loop. Accordingly, the address selection signals that can share the same control signal are sorted together based on the defined physical address of the subsystems, and the logic relations of the address selection signals of the FC HDDs and the system address signal are mapped, so as to define a number of logic components for routing, considering the drive capability and output pins of the logic components. It saves the space on the mid-plane, eliminates CPLD programming workload and simplifies the hardware design, thereby saving the manufacturing cost, for a system with up to 24 FC HDDs.

BRIEF DESCRIPTION OF THE DRAWINGS

The disclosure will become more fully understood from the detailed description given herein below for illustration only, and thus not limitative of the present invention, wherein.

DETAILED DESCRIPTION

Figure 1A:
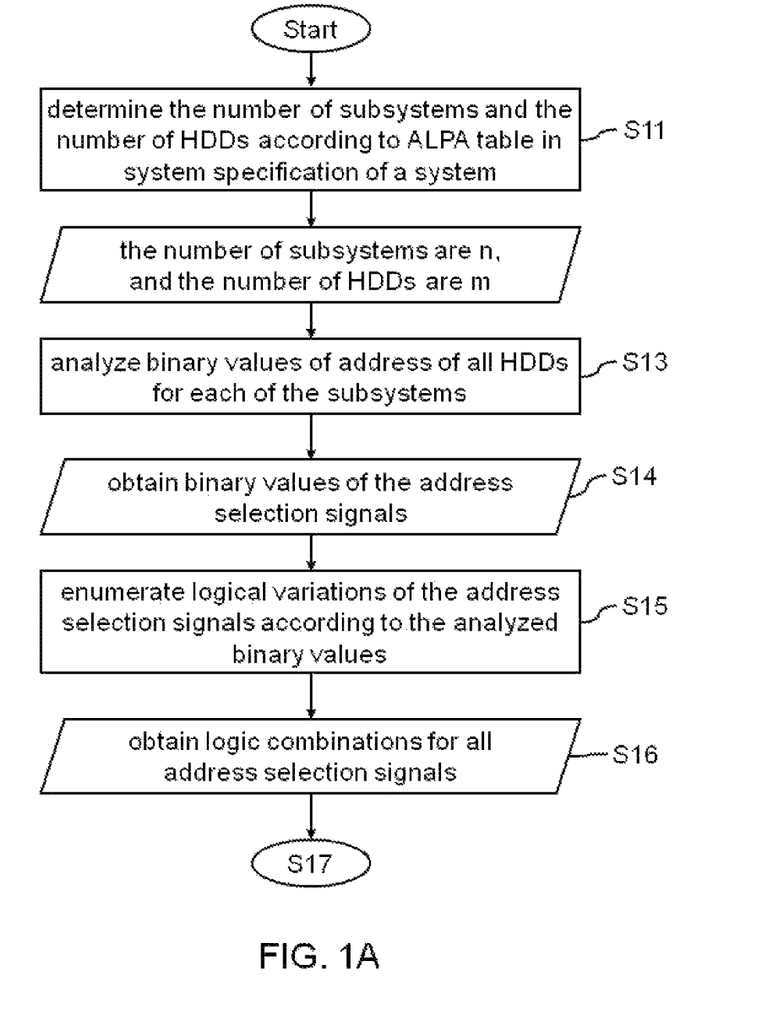
FIGS. 1A and 1B together show a flow chart for optimizing the control circuit for Fiber Channel Hard Disk Drive (FC HDD) configurations, in accordance with the present invention.
Figure 1B:
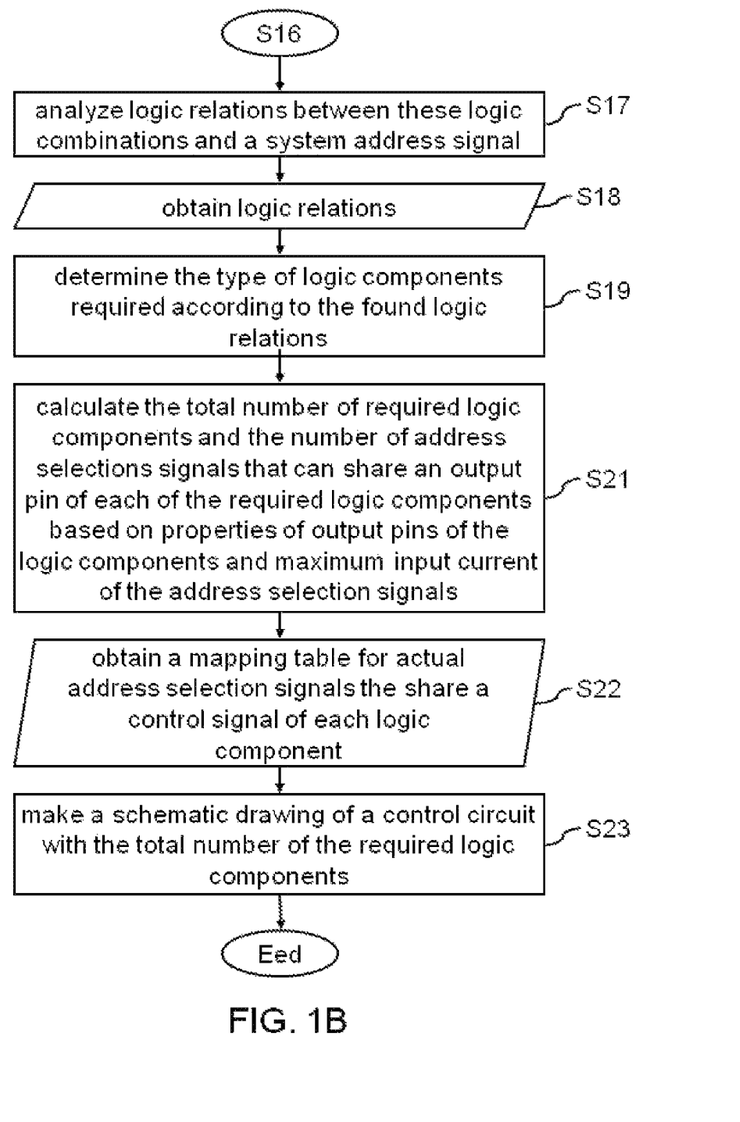
Figure 2:
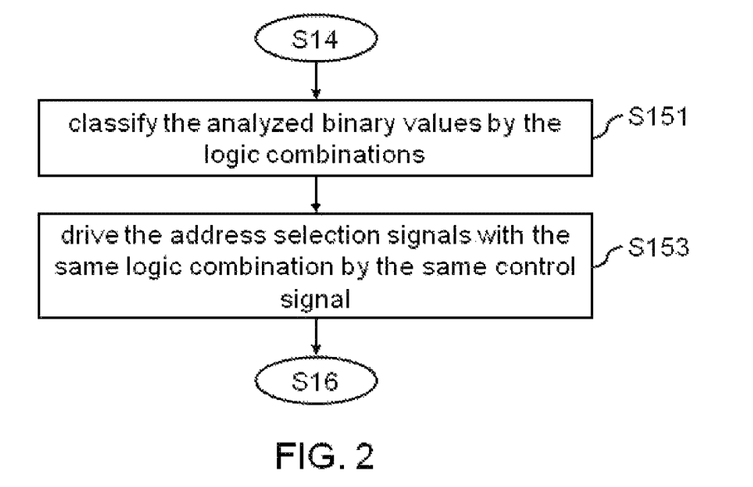
FIG. 2 is the flow chart of an embodiment of S15 shown in FIG. 1A.

Referring to FIGS. 1A and 1B, the number of subsystems supported in a FC loop and the number of HDDs to be supported in each subsystem is determined according to ALPA table in the system specification of a system (S11). Then, the binary values of the address selection signals of all HDDs for different subsystems are analyzed according to the ALPA table in the system specification (S13), so as to confirm the logic level of address selection signals in the different subsystem, and then obtain the binary values of the address selection signals (S14). After that, the logical variations of the address selection signals are enumerated according to the analyzed binary values (S15), so as to confirm the address selection signals that can share a control signal in theory and obtain the logic combinations for all address selection signals (S16). If n subsystems are supported in the FC loop and m HDDs are supported in each subsystem, there are no more than $2^n$ logic combinations. The n is an integer and larger than 1, and the m is an integer and larger than 1. Then, referring to FIG. 2, all the previously analyzed binary values are classified by the logic combinations (S151). All address selection signals with the same logic combination can be driven by the same control signal, because they are all set to level 1 or 0 (S153).

Figure 3:
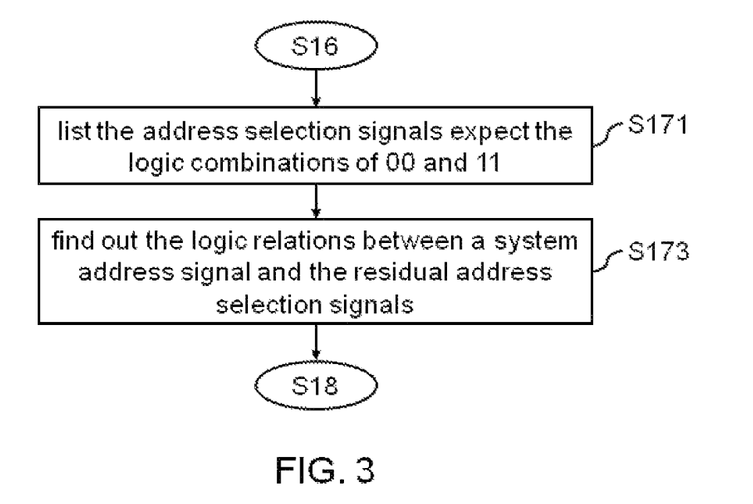
FIG. 3 is the flow chart of an embodiment of S17 shown in FIG. 1B.

Then, the logic relations between these logic combinations and the system address signal as well as the relations therebetween are analyzed (S17), so as to obtain the logic relations (S18). In some embodiments, referring to FIG. 3, the address selection signals are listed expect the logic combinations of "00" and "11" (S171). Because address selection signals that are always 0b0 can be bound to logic GND directly, and address selection signals that are always 0b1 can be bound to the 3.3V or 5V DC power with a 10 Kohm pull-up resistor, therefore address selection signals that are always 0 and 1 for different systems can be ignored. Then, the logic relations between a system address signal and the residual address selection signals are found out (S173). The number of logic components required is directly related to the complexity of the logic relations. Therefore, the logic complexity is simplified to minimize the number of the logic components.

The type of logic components required are determined according to the found logic relations (S19), and then the total number of required logic components and the number of address selections signals that can share a common output pin are calculated based on the number of output pins on the logic components, the drive capability of the output pins, and the maximum input current of the address selection signals (S21), so as to obtain a mapping table for actual address selection signals the share a control signal of each logic component (S22). A mapping table is made up correspondingly for clear view, referring to Table 4. Table 4 illustrates the implementation of address selection signals using the logic components. To facilitate the layout work, the control signal should be shared by the address selection signals of the same and adjacent HDDs.

Finally, the schematic drawing of a control circuit for the FC HDDs is made accordingly with the total number of the required logic components (S23). Address selection signals that share one control signal shall be added an isolated resistor, preferably of 1 Kohm, to avoid the impact on other signals when one is shorted.

In some embodiments, a FC loop that has two cascaded subsystems (called first subsystem and second subsystem, respectively) with each supporting up to 48 FC HDDs is designed in architecture.

In the embodiment, the system has 336 address selection signals and 1 system address signal with logic 0 indicating first subsystem and logic 1 indicating second subsystem.

The physical address for each FC HDD in two cascaded subsystems is distributed. Table 1 shows the binary values for the address selection signals of two cascaded systems of 48 FC HDDs. Referring to Table 1, the binary values of address of all HDDs for different subsystems are analyzed according to the known ALPA table in the SFF-8045 specification, and then the binary values of the HDD address are made according to the known ALPA table in SFF-8045 specification.

All the previously analyzed binary values are classified by the logic combinations. Table 2 shows the address selection signals that can share the same control signal. As there are two subsystems cascaded in the FC loop, there are only 4 logic combinations, i.e., 00, 01, 10, 11, for all the address selection signals, referring to Table 2.

Then, the logic relations between these logic combinations and the system address signal are analyzed. Among these signals, "00" combinations can be bound to logic GND directly, and "11" combinations can be bound to the 3.3V power with a 10 Kohm pull-up resistor. Therefore, the address selection signals that are always 0 and 1 for different systems are ignored, and only 224 signals in the logic combinations of "01" and "10" need to be controlled by the logic components. Table 3 shows the logic relations between the system address signal and the address selection signals of the FC HDDs except the logic combinations of "00" and "11". Referring to Table 3, the logic relation between the system address signal and the logic combinations of "01" is EQUIVALENT, and the logic relation between the system address signal and the logic combinations of "10" is NOT.

Figure 4:
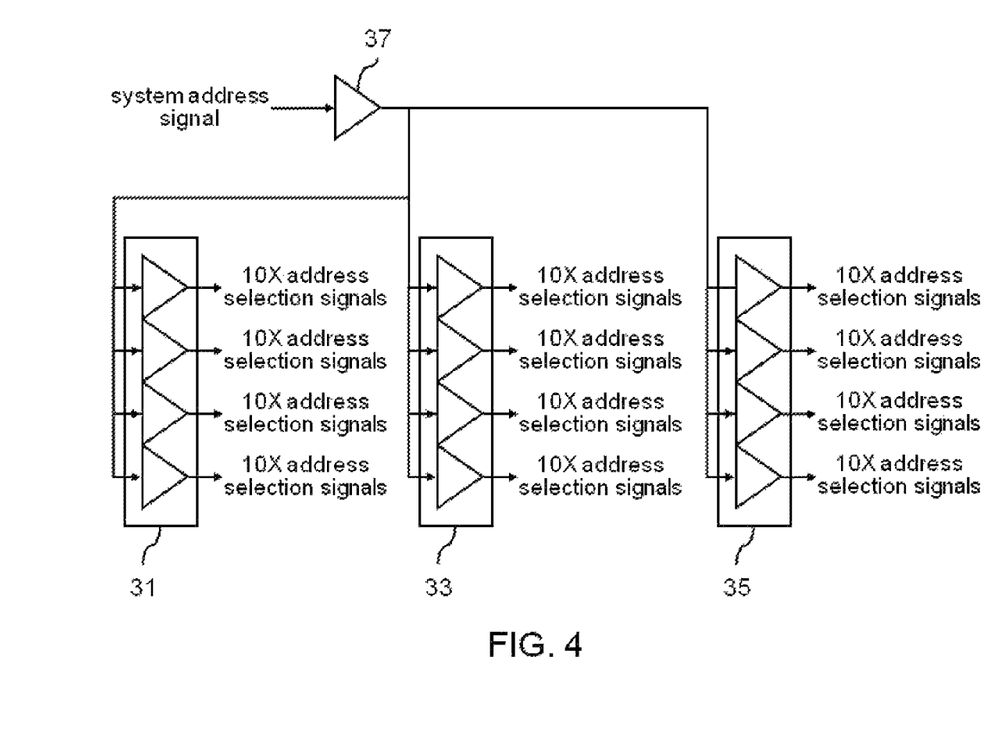
FIG. 4 is the schematic view of the 4 logic components according to the method of this invention.

According to the logic relations, only two types of logic components, i.e. "BUFFER" and "NOT", are required to control the address selection signals. The maximal input current of each address selection signal of FC HDD is 250 uA at logic high, and 1 mA at logic low. The output pin of the required logic component is usually in the open drain mode. So only the drive capability of the logic component at logic low needs to be calculated. The drive capability of logic component usually can support 20 mA or more at logic low. Considering 50% margin for example, 10 address selection signals would share one control signal (the output pin of the logic component). According to the Table 2, there are 80 address selection signals that are the logic combinations of "01", and 32 address selection signals that are the logic combinations of "10". So two 4-output BUFFER components 31-33 and one 4-output NOT component 35 are required for these signals, as shown in FIG. 4. In addition, the input signals of these three logic components are driven by the system address signal. Therefore, another 1-output BUFFER component 37 is added between each input signal of these three logic components and the system address signal in case the drive capability of system address signal is too low. That is, referring to FIG. 4, the output terminal of the BUFFER component 37 is connected to each input terminal of the BUFFER components 31-33 and the NOT component 35. The input terminal of the BUFFER component 37 receives the system address signal. The BUFFER component 37 generates an intermediate address signal based on the system address signal, and then outputs it by the output terminal thereof. Each of the BUFFER components 31-33 and the NOT component 35 receives the intermediate address signal, and generates and outputs the multiple sets of 10× address selection signals based on the intermediate address signal. Thus, four logic components (i.e. the BUFFER components 31-33-37 and the NOT component 35) are required in total for the system, referring to the schematic drawing of FIG. 4. It saves both the cost and space compared to the conventional CPLD solution. Furthermore, the hardware design complexity is reduced and the CPLD programming workload is eliminated.

In some embodiments, the method for optimizing control circuit for FC HDDs in a system may be implemented by a computer program product, so that after a computer loads with the computer program and executes the computer program, the method for optimizing control circuit for FC HDDs in a system according to any embodiment of the present invention may be performed. In some embodiments, the computer program product may be a readable recording medium, and the computer program is stored in the readable recording medium to be loaded into the computer. In some embodiments, the computer program itself may be a computer program product, and transmitted to the computer in a wired manner or wireless manner.

As above, in the application of the method for optimizing control circuit for FC HDDs in a system according to the present invention, the logic level of the address selection signals of the FC HDDs varies with the number of subsystems included in a FC loop. Accordingly, the address selection signals that can share the same control signal are sorted together based on the defined physical address of the subsystems, and the logic relations of the address selection signals of the FC HDDs and the system address signal are mapped, so as to define a number of logic components for routing, considering the drive capability and output pins of the logic components. It saves the space on the mid-plane, eliminates CPLD programming workload and simplifies the hardware design, thereby saving the manufacturing cost, when a system of up to 24 FC HDDs.

While the present invention has been described by way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

TABLE 1

Binary Value in Different Enclosures

| SLOT | ENCL0 | | | ENCL1 | | |
|---|---|---|---|---|---|---|
| | SEL_BIN | SEL_HEX | ALPA | SEL_BIN | SEL_HEX | ALPA |
| 0 | 0000000 | 0 | EF | 0110000 | 30 | 98 |
| 1 | 0000001 | 1 | E8 | 0110001 | 31 | 97 |
| 2 | 0000010 | 2 | E4 | 0110010 | 32 | 90 |
| 3 | 0000011 | 3 | E2 | 0110011 | 33 | 8F |
| 4 | 0000100 | 4 | E1 | 0110100 | 34 | 88 |
| 5 | 0000101 | 5 | E0 | 0110101 | 35 | 84 |
| 6 | 0000110 | 6 | DC | 0110110 | 36 | 82 |
| 7 | 0000111 | 7 | DA | 0110111 | 37 | 81 |
| 8 | 0001000 | 8 | D9 | 0111000 | 38 | 80 |
| 9 | 0001001 | 9 | D6 | 0111001 | 39 | 7C |
| 10 | 0001010 | A | D5 | 0111010 | 3A | 7A |
| 11 | 0001011 | B | D4 | 0111011 | 3B | 79 |
| 12 | 0001100 | C | D3 | 0111100 | 3C | 76 |
| 13 | 0001101 | D | D2 | 0111101 | 3D | 75 |
| 14 | 0001110 | E | D1 | 0111110 | 3E | 74 |
| 15 | 0001111 | F | CE | 0111111 | 3F | 73 |
| 16 | 0010000 | 10 | CD | 1000000 | 40 | 72 |
| 17 | 0010001 | 11 | CC | 1000001 | 41 | 71 |
| 18 | 0010010 | 12 | CB | 1000010 | 42 | 6E |
| 19 | 0010011 | 13 | CA | 1000011 | 43 | 6D |
| 20 | 0010100 | 14 | C9 | 1000100 | 44 | 6C |
| 21 | 0010101 | 15 | C7 | 1000101 | 45 | 6B |
| 22 | 0010110 | 16 | C6 | 1000110 | 46 | 6A |
| 23 | 0010111 | 17 | C5 | 1000111 | 47 | 69 |
| 24 | 0011000 | 18 | C3 | 1001000 | 48 | 67 |
| 25 | 0011001 | 19 | BC | 1001001 | 49 | 66 |
| 26 | 0011010 | 1A | BA | 1001010 | 4A | 65 |
| 27 | 0011011 | 1B | B9 | 1001011 | 4B | 63 |
| 28 | 0011100 | 1C | B6 | 1001100 | 4C | 5C |
| 29 | 0011101 | 1D | B5 | 1001101 | 4D | 5A |
| 30 | 0011110 | 1E | B4 | 1001110 | 4E | 59 |
| 31 | 0011111 | 1F | B3 | 1001111 | 4F | 56 |
| 32 | 0100000 | 20 | B2 | 1010000 | 50 | 55 |
| 33 | 0100001 | 21 | B1 | 1010001 | 51 | 54 |
| 34 | 0100010 | 22 | AE | 1010010 | 52 | 53 |
| 35 | 0100011 | 23 | AD | 1010011 | 53 | 52 |
| 36 | 0100100 | 24 | AC | 1010100 | 54 | 51 |
| 37 | 0100101 | 25 | AB | 1010101 | 55 | 4E |
| 38 | 0100110 | 26 | AA | 1010110 | 56 | 4D |
| 39 | 0100111 | 27 | A9 | 1010111 | 57 | 4C |
| 40 | 0101000 | 28 | A7 | 1011000 | 58 | 4B |
| 41 | 0101001 | 29 | A6 | 1011001 | 59 | 4A |
| 42 | 0101010 | 2A | A5 | 1011010 | 5A | 49 |
| 43 | 0101011 | 2B | A3 | 1011011 | 5B | 47 |
| 44 | 0101100 | 2C | 9F | 1011100 | 5C | 46 |
| 45 | 0101101 | 2D | 9E | 1011101 | 5D | 45 |
| 46 | 0101110 | 2E | 9D | 1011110 | 5E | 43 |
| 47 | 0101111 | 2F | 9B | 1011111 | 5F | 3C |

TABLE 2

Logic Combinations for all Address Selection Signals

| 00 | 01 | 10 | 11 |
|---|---|---|---|
| SEL_0_0 | SEL_4_0 | SEL_4_16 | SEL_0_1 |
| SEL_0_2 | SEL_4_1 | SEL_4_17 | SEL_0_3 |
| SEL_0_4 | SEL_4_2 | SEL_4_18 | SEL_0_5 |
| SEL_0_6 | SEL_4_3 | SEL_4_19 | SEL_0_7 |

TABLE 2-continued

Logic Combinations for all Address Selection Signals

| 00 | 01 | 10 | 11 |
|---|---|---|---|
| SEL_0_8 | SEL_4_4 | SEL_4_20 | SEL_0_9 |
| SEL_0_10 | SEL_4_5 | SEL_4_21 | SEL_0_11 |
| SEL_0_12 | SEL_4_6 | SEL_4_22 | SEL_0_13 |
| SEL_0_14 | SEL_4_7 | SEL_4_23 | SEL_0_15 |
| SEL_0_16 | SEL_4_8 | SEL_4_24 | SEL_0_17 |
| SEL_0_18 | SEL_4_9 | SEL_4_25 | SEL_0_19 |
| SEL_0_20 | SEL_4_10 | SEL_4_26 | SEL_0_21 |
| SEL_0_22 | SEL_4_11 | SEL_4_27 | SEL_0_23 |
| SEL_0_24 | SEL_4_12 | SEL_4_28 | SEL_0_25 |
| SEL_0_26 | SEL_4_13 | SEL_4_29 | SEL_0_27 |
| SEL_0_28 | SEL_4_14 | SEL_4_30 | SEL_0_29 |
| SEL_0_30 | SEL_4_15 | SEL_4_31 | SEL_0_31 |
| SEL_0_32 | SEL_4_32 | SEL_5_32 | SEL_0_33 |
| SEL_0_34 | SEL_4_33 | SEL_5_33 | SEL_0_35 |
| SEL_0_36 | SEL_4_34 | SEL_5_34 | SEL_0_37 |
| SEL_0_38 | SEL_4_35 | SEL_5_35 | SEL_0_39 |
| SEL_0_40 | SEL_4_36 | SEL_5_36 | SEL_0_41 |
| SEL_0_42 | SEL_4_37 | SEL_5_37 | SEL_0_43 |
| SEL_0_44 | SEL_4_38 | SEL_5_38 | SEL_0_45 |
| SEL_0_46 | SEL_4_39 | SEL_5_39 | SEL_0_47 |
| SLE_1_0 | SEL_4_40 | SEL_5_40 | SLE_1_2 |
| SLE_1_1 | SEL_4_41 | SEL_5_41 | SLE_1_3 |
| SLE_1_4 | SEL_4_42 | SEL_5_42 | SLE_1_6 |
| SLE_1_5 | SEL_4_43 | SEL_5_43 | SLE_1_7 |
| SLE_1_8 | SEL_4_44 | SEL_5_44 | SLE_1_10 |
| SLE_1_9 | SEL_4_45 | SEL_5_45 | SLE_1_11 |
| SLE_1_12 | SEL_4_46 | SEL_5_46 | SLE_1_14 |
| SLE_1_13 | SEL_4_47 | SEL_5_47 | SLE_1_15 |
| SLE_1_16 | SEL_5_0 | | SLE_1_18 |
| SLE_1_17 | SEL_5_1 | | SLE_1_19 |
| SLE_1_20 | SEL_5_2 | | SLE_1_22 |
| SLE_1_21 | SEL_5_3 | | SLE_1_23 |
| SLE_1_24 | SEL_5_4 | | SLE_1_26 |
| SLE_1_25 | SEL_5_5 | | SLE_1_27 |
| SLE_1_28 | SEL_5_6 | | SLE_1_30 |
| SLE_1_29 | SEL_5_7 | | SLE_1_31 |
| SLE_1_32 | SEL_5_8 | | SLE_1_34 |
| SLE_1_33 | SEL_5_9 | | SLE_1_35 |
| SLE_1_36 | SEL_5_10 | | SLE_1_38 |
| SLE_1_37 | SEL_5_11 | | SLE_1_39 |
| SLE_1_40 | SEL_5_12 | | SLE_1_42 |
| SLE_1_41 | SEL_5_13 | | SLE_1_43 |
| SLE_1_44 | SEL_5_14 | | SLE_1_46 |
| SLE_1_45 | SEL_5_15 | | SLE_1_47 |
| SEL_2_0 | SEL_6_16 | | SEL_2_4 |
| SEL_2_1 | SEL_6_17 | | SEL_2_5 |
| SEL_2_2 | SEL_6_18 | | SEL_2_6 |
| SEL_2_3 | SEL_6_19 | | SEL_2_7 |
| SEL_2_8 | SEL_6_20 | | SEL_2_12 |
| SEL_2_9 | SEL_6_21 | | SEL_2_13 |
| SEL_2_10 | SEL_6_22 | | SEL_2_14 |
| SEL_2_11 | SEL_6_23 | | SEL_2_15 |
| SEL_2_16 | SEL_6_24 | | SEL_2_20 |
| SEL_2_17 | SEL_6_25 | | SEL_2_21 |
| SEL_2_18 | SEL_6_26 | | SEL_2_22 |
| SEL_2_19 | SEL_6_27 | | SEL_2_23 |
| SEL_2_24 | SEL_6_28 | | SEL_2_28 |
| SEL_2_25 | SEL_6_29 | | SEL_2_29 |
| SEL_2_26 | SEL_6_30 | | SEL_2_30 |
| SEL_2_27 | SEL_6_31 | | SEL_2_31 |
| SEL_2_32 | SEL_6_32 | | SEL_2_36 |
| SEL_2_33 | SEL_6_33 | | SEL_2_37 |
| SEL_2_34 | SEL_6_34 | | SEL_2_38 |
| SEL_2_35 | SEL_6_35 | | SEL_2_39 |
| SEL_2_40 | SEL_6_36 | | SEL_2_44 |
| SEL_2_41 | SEL_6_37 | | SEL_2_45 |
| SEL_2_42 | SEL_6_38 | | SEL_2_46 |
| SEL_2_43 | SEL_6_39 | | SEL_2_47 |
| SEL_3_0 | SEL_6_40 | | SEL_3_8 |
| SEL_3_1 | SEL_6_41 | | SEL_3_9 |
| SEL_3_2 | SEL_6_42 | | SEL_3_10 |
| SEL_3_3 | SEL_6_43 | | SEL_3_11 |
| SEL_3_4 | SEL_6_44 | | SEL_3_12 |
| SEL_3_5 | SEL_6_45 | | SEL_3_13 |
| SEL_3_6 | SEL_6_46 | | SEL_3_14 |
| SEL_3_7 | SEL_6_47 | | SEL_3_15 |
| SEL_3_16 | | | SEL_3_24 |
| SEL_3_17 | | | SEL_3_25 |
| SEL_3_18 | | | SEL_3_26 |
| SEL_3_19 | | | SEL_3_27 |
| SEL_3_20 | | | SEL_3_28 |
| SEL_3_21 | | | SEL_3_29 |
| SEL_3_22 | | | SEL_3_30 |
| SEL_3_23 | | | SEL_3_31 |
| SEL_3_32 | | | SEL_3_40 |
| SEL_3_33 | | | SEL_3_41 |
| SEL_3_34 | | | SEL_3_42 |
| SEL_3_35 | | | SEL_3_43 |
| SEL_3_36 | | | SEL_3_44 |
| SEL_3_37 | | | SEL_3_45 |
| SEL_3_38 | | | SEL_3_46 |
| SEL_3_39 | | | SEL_3_47 |
| SEL_5_16 | | | |
| SEL_5_17 | | | |
| SEL_5_18 | | | |
| SEL_5_19 | | | |
| SEL_5_20 | | | |
| SEL_5_21 | | | |
| SEL_5_22 | | | |
| SEL_5_23 | | | |
| SEL_5_24 | | | |
| SEL_5_25 | | | |
| SEL_5_26 | | | |
| SEL_5_27 | | | |
| SEL_5_28 | | | |
| SEL_5_29 | | | |
| SEL_5_30 | | | |
| SEL_5_31 | | | |
| SEL_6_0 | | | |
| SEL_6_1 | | | |
| SEL_6_2 | | | |
| SEL_6_3 | | | |
| SEL_6_4 | | | |
| SEL_6_5 | | | |
| SEL_6_6 | | | |
| SEL_6_7 | | | |
| SEL_6_8 | | | |
| SEL_6_9 | | | |
| SEL_6_10 | | | |
| SEL_6_11 | | | |
| SEL_6_12 | | | |
| SEL_6_13 | | | |
| SEL_6_14 | | | |
| SEL_6_15 | | | |

TABLE 3

Selection Signal Combination and System Address Signal Mapping

| System Address Signal | Selection Signal Combination | |
|---|---|---|
| (A) | 01 | 10 |
| 0 | =A | =NOT A |
| 1 | =A | =NOT A |

TABLE 4

Signal Implementation with Logic Components

| Logic Component | Output Pin | Select Signal | System Logic | Output Logic |
|---|---|---|---|---|
| Buffer 1 | 1 | SEL_4_0 | 0 | 0 |
| | | SEL_4_1 | 1 | 1 |
| | | SEL_4_2 | | |

TABLE 4-continued

Signal Implementation with Logic Components

| Logic Component | Output Pin | Select Signal | System Logic | Output Logic |
|---|---|---|---|---|
| | | SEL_4_3 | | |
| | | SEL_4_4 | | |
| | | SEL_4_5 | | |
| | | SEL_4_6 | | |
| | | SEL_4_7 | | |
| | | SEL_4_8 | | |
| | | SEL_4_9 | | |
| | 2 | SEL_4_10 | | |
| | | SEL_4_11 | | |
| | | SEL_4_12 | | |
| | | SEL_4_13 | | |
| | | SEL_4_14 | | |
| | | SEL_4_15 | | |
| | | SEL_4_32 | | |
| | | SEL_4_33 | | |
| | | SEL_4_34 | | |
| | | SEL_4_35 | | |
| | 3 | SEL_4_36 | | |
| | | SEL_4_37 | | |
| | | SEL_4_38 | | |
| | | SEL_4_39 | | |
| | | SEL_4_40 | | |
| | | SEL_4_41 | | |
| | | SEL_4_42 | | |
| | | SEL_4_43 | | |
| | | SEL_4_44 | | |
| | | SEL_4_45 | | |
| | 4 | SEL_4_46 | | |
| | | SEL_4_47 | | |
| | | SEL_5_0 | | |
| | | SEL_5_1 | | |
| | | SEL_5_2 | | |
| | | SEL_5_3 | | |
| | | SEL_5_4 | | |
| | | SEL_5_5 | | |
| | | SEL_5_6 | | |
| | | SEL_5_7 | | |
| Buffer 2 | 1 | SEL_5_8 | 0 | 0 |
| | | SEL_5_9 | 1 | 1 |
| | | SEL_5_10 | | |
| | | SEL_5_11 | | |
| | | SEL_5_12 | | |
| | | SEL_5_13 | | |
| | | SEL_5_14 | | |
| | | SEL_5_15 | | |
| | | SEL_6_16 | | |
| | | SEL_6_17 | | |
| | 2 | SEL_6_18 | | |
| | | SEL_6_19 | | |
| | | SEL_6_20 | | |
| | | SEL_6_21 | | |
| | | SEL_6_22 | | |
| | | SEL_6_23 | | |
| | | SEL_6_24 | | |
| | | SEL_6_25 | | |
| | | SEL_6_26 | | |
| | | SEL_6_27 | | |
| | 3 | SEL_6_28 | | |
| | | SEL_6_29 | | |
| | | SEL_6_30 | | |
| | | SEL_6_31 | | |
| | | SEL_6_32 | | |
| | | SEL_6_33 | | |
| | | SEL_6_34 | | |
| | | SEL_6_35 | | |
| | | SEL_6_36 | | |
| | | SEL_6_37 | | |
| | 4 | SEL_6_38 | | |
| | | SEL_6_39 | | |
| | | SEL_6_40 | | |
| | | SEL_6_41 | | |
| | | SEL_6_42 | | |
| | | SEL_6_43 | | |
| | | SEL_6_44 | | |
| | | SEL_6_45 | | |
| | | SEL_6_46 | | |
| | | SEL_6_47 | | |
| NOT | 1 | SEL_4_16 | 0 | 1 |
| | | SEL_4_17 | 1 | 0 |
| | | SEL_4_18 | | |
| | | SEL_4_19 | | |
| | | SEL_4_20 | | |
| | | SEL_4_21 | 0 | 1 |
| | | SEL_4_22 | 1 | 0 |
| | | SEL_4_23 | | |
| | | SEL_4_24 | | |
| | | SEL_4_25 | | |
| | 2 | SEL_4_26 | 0 | 1 |
| | | SEL_4_27 | 1 | 0 |
| | | SEL_4_28 | | |
| | | SEL_4_29 | | |
| | | SEL_4_30 | | |
| | | SEL_4_31 | | |
| | | SEL_5_32 | | |
| | | SEL_5_33 | | |
| | | SEL_5_34 | | |
| | | SEL_5_35 | | |
| | 3 | SEL_5_36 | | |
| | | SEL_5_37 | | |
| | | SEL_5_38 | | |
| | | SEL_5_39 | | |
| | | SEL_5_40 | | |
| | | SEL_5_41 | | |
| | | SEL_5_42 | | |
| | | SEL_5_43 | | |
| | | SEL_5_44 | | |
| | | SEL_5_45 | | |
| | 4 | SEL_5_46 | | |
| | | SEL_5_47 | | |

What is claimed is:

1. A method for optimizing control circuit for Fiber Channel hard disk drives (FC HDDs) in a system, comprising:
   determining the number of subsystems supported in a Fiber Channel (FC) loop and the number of HDDs to be supported in each of the subsystems according to an arbitrated loop physical addressing (ALPA) table in a system specification of a system;
   analyzing binary values of address selection signals of all the HDDs for each of the subsystems according to the ALPA table in the system specification of the system;
   enumerating logical variations of the address selection signals according to the analyzed binary values to obtain logic combinations for the address selection signals;
   analyzing logic relations between these logic combinations and a system address signal;
   determining logic components required according to the analyzed logic relations; and
   calculating the total number of required logic components and the number of address selections signals that can share an output pin of each of the required logic components based on properties of output pins of the logic components and maximum input current of the address selection signals.

2. The method for optimizing control circuit for FC HDDs in a system according to claim 1, further comprising:
   making a schematic drawing of a control circuit with the total number of the required logic components.

3. The method for optimizing control circuit for FC HDDs in a system according to claim 2, wherein the making step of the schematic drawing comprises:

providing a first BUFFER component for receiving a system address signal;

providing at least one second BUFFER component each for outputting at least one of the address selection signals, wherein output terminal of the first BUFFER component is connected to input terminal of the at least one second BUFFER component; and providing at least one NOT component each for outputting at least one of the address selection signals, wherein the output terminal of the first BUFFER component is connected to input terminal of the at least one NOT component.

4. The method for optimizing control circuit for FC HDDs in a system according to claim 1, wherein the number of subsystems is n that is an integer and larger than 1, and the number of the logic combinations is no more than $2^n$.

5. The method for optimizing control circuit for FC HDDs in a system according to claim 1, wherein the analyzing step of the binary values comprises:

confirming logic level of the address selection signals in the different subsystem.

6. The method for optimizing control circuit for FC HDDs in a system according to claim 1, wherein the enumerating step of the logical variations comprises:

classifying the analyzed binary values by the logic combinations; and driving the address selection signals with the same logic combination by the same control signal.

7. The method for optimizing control circuit for FC HDDs in a system according to claim 1, wherein the analyzing step of the logic relations comprises:

listing the address selection signals expect the logic combinations of 00 and 11; and finding out the logic relations between a system address signal and the residual address selection signals.

8. The method for optimizing control circuit for FC HDDs in a system according to claim 1, wherein in the determining step of the logic components, the types of the required logic components are determined according to the analyzed logic relations.

9. The method for optimizing control circuit for FC HDDs in a system according to claim 1, wherein the number of the required logic components is directly related to the complexity of the logic relations.

10. A non-transitory computer program product, configured for implementing the method for optimizing control circuit for FC HDDs in a system according to claim 1 after a computer loads with and executes a computer program.

11. A control circuit for Fiber Channel hard disk drives (FC HDDs) in a system, comprising:

a first logic component, for receiving a system address signal and outputting an intermediate address signal; and a plurality of second logic components, each for receiving the intermediate address signal and outputting multiple sets of a plurality of address selection signals, wherein the second logic components comprises: at least one Buffer component, each for receiving the intermediate address signal and outputting the sets of the address selection signals; and a NOT component, each for receiving the intermediate address signal and outputting the sets of the address selection signals, wherein each of the at least one Buffer component has a plurality of output terminals, and the NOT component has a plurality of output terminals.

12. The control circuit for FC HDDs in a system according to claim 11, wherein each of the second logic components has a plurality of output terminals.

13. The control circuit for FC HDDs in a system according to claim 11, wherein the first logic component has a single output terminal.

14. The control circuit for FC HDDs in a system according to claim 11, wherein the first logic component is a Buffer component.

* * * * *